United States Patent

[11] 3,603,934

[72] Inventors Harold F. Heath, Jr.
Poughkeepsie;
Samir S. Husson, White Plains, both of, N.Y.

[21] Appl. No. 744,950
[22] Filed July 15, 1968
[45] Patented Sept. 7, 1971
[73] Assignee International Business Machines Corporation Armonk, N.Y.

[54] DATA PROCESSING SYSTEM CAPABLE OF OPERATION DESPITE A MALFUNCTION
13 Claims, 7 Drawing Figs.

[52] U.S. Cl. .......... 340/172.5, 340/146.1
[51] Int. Cl. .......... G06f 7/00, G06f 11/00
[50] Field of Search .......... 235/157, 153; 340/172.5, 146.1

[56] References Cited

UNITED STATES PATENTS

| | | | |
|---|---|---|---|
| 3,302,182 | 1/1967 | Lynch et al. | 340/172.5 |
| 3,345,614 | 10/1967 | Neel | 340/172.5 |
| 3,253,259 | 5/1966 | Jacoby | 340/146.1 X |

*Primary Examiner*—Paul J. Henon
*Assistant Examiner*—Melvin B. Chapnick
*Attorneys*—Hanifin and Jancin and Edward S. Gershuny

ABSTRACT: An electronic data processing machine wherein various functional units such as the adder and certain registers may be utilized at one-half or a lesser fraction of their normal operating capability. Upon detection of an error in one of said functional units, the system will determine whether one-half of the unit is functioning properly. Data will be sent through the properly functioning half of the unit in two or more passes to perform the same operation that would have been performed in one pass if there had been no malfunction. Upon termination of the error condition the unit is automatically returned to its normal operating mode.

INVENTORS
HAROLD F. HEATH, JR.
SAMIR S. HUSSON

BY *Edward S. Gershuny*
ATTORNEY

DATA PROCESSING SYSTEM CAPABLE OF OPERATION DESPITE A MALFUNCTION

BACKGROUND OF THE INVENTION

The invention will be described with reference to apparatus embodied in an electronic digital computer containing a read only control storage which controls execution of stored program instructions. However, the invention may be used in data processing machines which do not utilize a read only control storage, and in "special-purpose computers" which are built specifically to preform only one (or a very limited number of) tasks, and which have a "program" built into the hardware of the machine.

Electronic digital computers operate upon data in accordance with instructions arranged into a number of programs. Both the data and the instructions are represented by electrical signal pulses, each signal being assigned, depending upon its value, either the binary quantity 0 (0-bit) or the binary quantity 1 (1-bit). A plurality of these binary "bits" (binary digits) are arranged to represent a data "word" or an instruction "word." Data words are processed in the system in accordance with the instruction words; instruction words being executed one at a time in sequence as taken from a program.

Instructions are usually executed as a series of time-spaced steps. During the execution of any of these steps, it is possible that there may be a malfunction in the system. Malfunctions, or "errors," can be either short-lived ("transient") or long-lived ("solid" A transient error may, for example, be the result of a sudden fluctuation in the power supply or the result of a mechanical shock. Failure of a component, such as a transistor or a diode, may result in a solid error.

In the prior art the earliest attempt to deal with the occurrence of errors generally disregarded the classification of an error as transient or solid. In one well-known prior art scheme, the detection of any error would completely stop the system. This resulted in an expensive nonusage of the system until corrective action could be taken by an operator. (The "corrective action" often consisted of restarting the job from its very beginning). The problem of extensive loss of time due to the occasional necessity of restarting a job from its beginning led to another prior art technique known as "program checkpointing" wherein, at spaced intervals of time, all information necessary to restart the job from the time in its performance at which the checkpoint was taken would be read out to an auxiliary storage medium such as a magnetic tape or disc. This information generally included such things as: the total contents of the computer storage; the state of all computer status indicators; the identity of the last record of input data successfully processed (this had to be done for every unit which furnished input to the computer); and the identity of the last record of output data furnished by the computer to each output device. Then, if an error caused the system to stop, all parts of the system could be reset to the condition that they were in at the time the checkpoint was taken and processing could continue from that point. Although the technique of software (program) checkpointing offered advantages when lengthy jobs were executed on a computer, it still had several drawbacks. For example, reinitializing the system to a previous checkpoint still resulted in a significant loss of time, and programmers were sometimes constrained by the requirement that lengthy programs be written in such a manner that checkpoints could be conveniently taken. Perhaps the most severe drawback of the software checkpointing technique was due to the fact that, even when no system errors were detected during the execution of a job (and this was true more often than not), an excessive amount of time and system resources were used in a nonproductive manner in taking the unused checkpoints. Even in those cases where a system error necessitated the utilization of a checkpoint, previous checkpoints which were not used represented nonproductive use of time and resources.

More recently, prior art schemes have been developed which differentiate between solid errors and transient errors. For example, various techniques are now known which will cause the computer to attempt to reexecute an instruction during the course of which an error had been detected. If the error was transient in nature, repetitive attempts to reexecute the instruction would finally result in a successful performance thereof. In most systems wherein an attempt is made to reexecute an instruction during the course of which an error had been detected, after a predetermined number of unsuccessful attempts to reexecute the instruction, the error would be classified as solid and the system would signal the operator that corrective action was necessary.

Prior art solutions to the problems raised by solid errors can be generally grouped into two classes: "redundant" systems, and "emulation" systems. A redundant system is one which contains more functional units than are needed when the system is running in its normal error-free state. For example, although the system may require only one adder for its normal operation, two separate adders may be built into it. Then, if one of the adders develops a solid malfunction, the other adder will automatically be switched into the data flow and used in its place. In an emulation system, various functional units of the system are designed in such a manner that they are capable of performing the job normally performed by another unit. In this type of system, if one unit develops a solid malfunction, another unit can be caused to take over its job.

Of the two systems mentioned above, the redundant system will generally be more expensive but will operate more efficiently if a solid error occurs. The emulation system will be less efficient because the occurrence of a solid malfunction will force at least one unit of the system to perform a double duty; that is, it will have to perform its own function as well as the function of the failing unit. Both of the above prior art techniques are generally fairly expensive: the redundant system is expensive because of the additional functional units that are required; the emulation system is expensive because of the additional flexibility that must be built into various ones of the functional units.

SUMMARY OF THE INVENTION

By exploiting the inherent parallelism present in various data paths of a data processing system, this invention permits the system to continue to operate despite the presence of a malfunction. Many of the functional units present in a data processing system (e.g. adder, mover, registers) operate in parallel upon the bits which comprise a word of data. Most of these units can be divided into identical halves, quarters, eighths, etc. In accordance with one aspect of the invention, detection of a malfunction in a functional unit (e.g., a parity error) will cause the system to determine whether one-half of the unit is functioning properly. If one-half of the unit is functioning properly, then the good half of the unit will be used twice, processing one-half of the data word each time, to produce a correct result. If neither half of the unit is functioning properly, this invention may be used to cause the system to determine whether one-fourth of the unit if functioning properly. If one-fourth of the unit is functioning properly, data processing can continue by utilizing the good portion four times. That is, one-fourth of the data will be passed through the good portion of the unit on each of four passes to produce a correct result. In the case of the exemplary environmental system herein described, this means that data would be processed one byte at a time. The recursive splitting of the functional unit may be continued to any desired limit, but it will generally be preferable not to use a smaller portion of the functional unit than the smallest portion thereof which can be checked for errors.

Data will generally be supplied to the functional unit from a resister or other source located elsewhere in the data processing system. The data will generally have been checked for parity and will be known to be error free. For those situations in which the source data may have been altered before an error is detected, an auxiliary ("ba:kup") register is provided to store the source data. In case of error, the data stored in the auxiliary register may be gated to the functional (e.g. Depending upon the gating arrangement between the auxiliary register and the functional units, one or more additional registers, each one capable of storing a portion of the source data, may also be required.

The required corrective action is initiated by detection of an error. In the exemplary environmental system, various gating controls are implemented in a read only control storage (ROS). The error signal may be used to cause an appropriate section of ROS to take control of the system. In the preferred embodiment of this invention, the first ROS control word to be utilized in case of an error is located at ROS location zero. The preferred manner of permitting the ROS word at location zero to assume control of the system is to use the error signal to inhibit the normal input to the ROS data register (ROSDR). This will result in the word at ROS location zero being selected for transfer to the ROSDR during the next ROS cycle. Further details of this are contained in copending application Ser. No. 697,738 filed Jan. 15, 1968 now U.S. Pat. No. 3,533,065 for DATA PROCESSING SYSTEM EXECUTION RETRY CONTROL by B. L. McGilvray et al., the disclosure of said copending application being incorporated herein by this reference. The ROS will then control gating of data through the system to enable multiple passes of sections of the data word through the functional unit which contains a malfunction.

This invention overcomes most of the problems that may be caused by machine malfunctions. Implementation of this invention will generally be less expensive than implementations of the prior art solutions referred to above. Clearly, the addition of a small number of gates and registers will be less expensive than the addition of an entire functional unit as required by redundant systems. The additional gates and registers may also, in many situations, be less expensive than design and implementation costs of various emulation systems. Although detection of an error will cause this invention to degrade the performance of the system to some extent, the degradation will be less than that introduced by various emulation systems. Of course, since this invention will enable the data processing system to continue to operate despite a malfunction, it has advantages over any system in which a solid malfunction causes the system to shut down.

The foregoing and other objects, features and advantages of the invention will be apparent from the following more particular description of preferred embodiments thereof, as illustrated in the accompanying drawings.

BRIEF DESCRIPTION OF THE DRAWINGS

FIG. 1 is a schematic block diagram of an environmental data processing system wherein this invention may be used.

BASIC ENVIRONMENTAL SYSTEM

Figure 4:
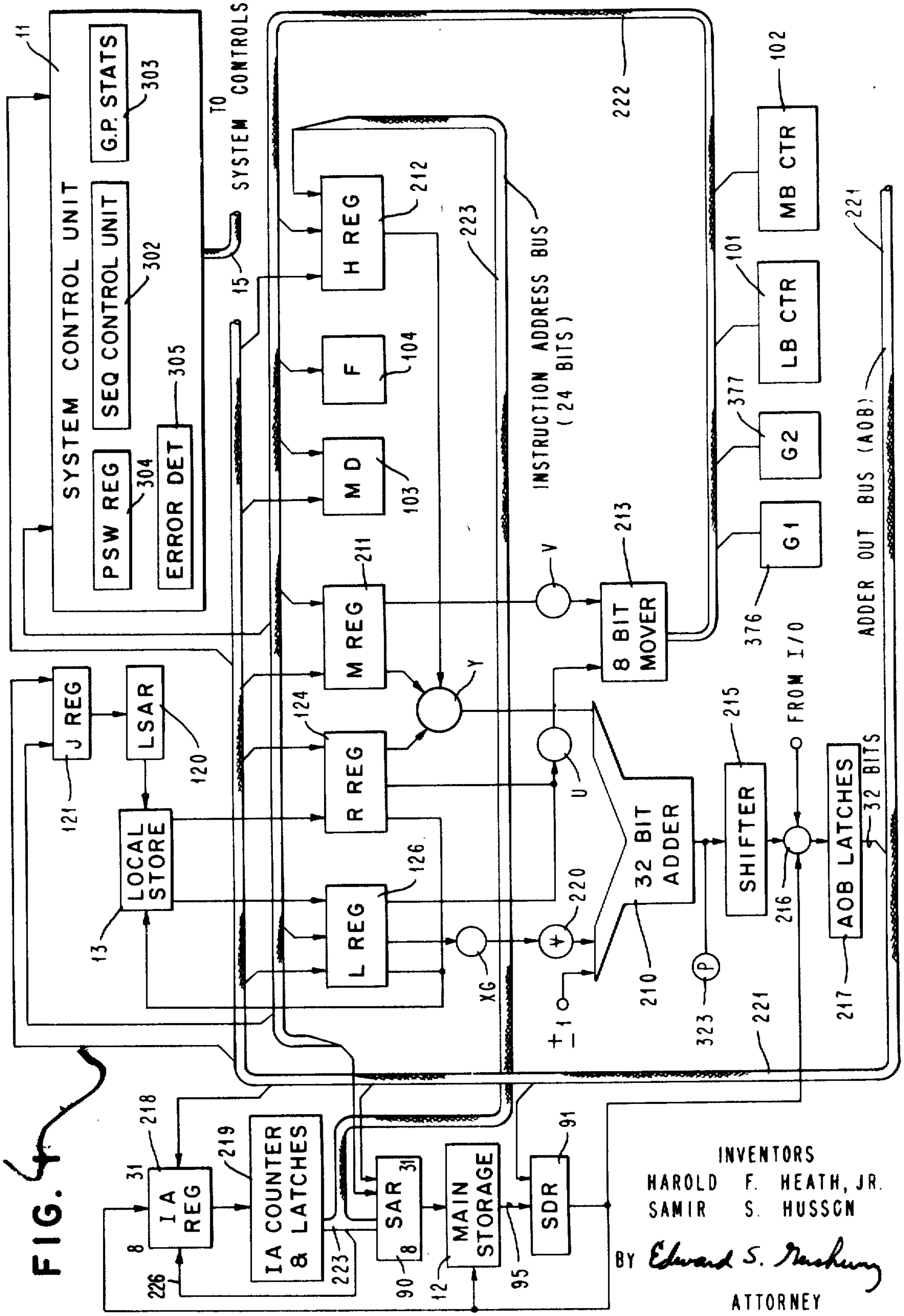
FIG. 4 is a schematic block diagram showing, in general, how the invention may be implemented for any functional unit of the data processing system.

The present invention is for use in a data processing system typically including storage, a central processing unit (CPU), a system control unit and some form of input/output (I/O) unit. Such a system is described in the following references:

1. U.S. Pat. application entitled, "Improved Program Suspension System," by Matthew A. Krygowski and Thomas S. Stafford, Ser. No. 573,246, filed Aug. 18, 1966, now U.S. Pat. No 3,453,600 and having the same assignee as the present invention;

2. "IBM System/360 Principles of Operation" Form A22—6821;

3. "System/360 Model 50, Comprehensive Introduction" Form 223—2821;

4. "Microprogramming Manual for the IBM System/360 Model 50" by S. S. Husson, Oct. 2, 1967, IBM Technical Report: TR 00. 1479—1.

5. "Microprogram Control for System/360" by S. G. Tucker, IBM Systems Journal, Volume 6, Number 4, 1967, pages 222—241.

The details of the basic environmental system as disclosed in the above references are hereby incorporated by this reference into this specification for the purpose of teaching the operation of a basic environmental system. Additional attention will be directed to those references hereinafter where appropriate to further identify details helpful in understanding the system operation.

With reference to FIG. 1, the system storage includes main storage (MS) 12 and local storage (LS) 13. Although no special input/output units are shown, such units are well known and communicate with the FIG. 1 system through the gating network 216 into the adder output bus (AOB) latches 217 onto the (AOB) 221. The system control unit 11 controls the system operation by opening and closing gates and establishing other control signals at extensive locations throughout the system. Since such gating and control signals and their implementation are well known, they are collectively represented by the output bus 15. Specific control signals important to the present invention will be discussed further hereinafter. The remainder of the circuitry shown in FIG. 1 is generally considered part of the CPU. The CPU and the system have the capability of executing store-in-place instructions.

Main Store

The main storage (MS) 12 may be physically integrated with the CPU or constructed as a stand-alone unit. The storage cycle speed is not directly related to the internal cycling of the CPU, thereby permitting an efficient relationship of CPU speed to storage size. Fetching and storage of data by the CPU are not affected by any concurrent I/O data transfer.

The main store 12 is preferably a matrix array of magnetic cores where a given address in the array is selected by signals in the storage address register (SAR) 90. When the SAR 90 contains a main store address, the main store 12, under its own internal timing controls, operates through its basic memory cycle to read information onto output sense lines 95 into the storage data register (SDR) 91. From SDR 91, data may be regenerated back into MS 12 and through the gating circuitry 216, the AOB latches 217, onto the adder output bus (AOB) 221.

The basic memory cycle includes a read half-cycle in which data are destructively read out from main storage into the SDR followed by a write half-cycle in which the information in the SDR is regenerated back into main storage. By placing different information into the SDR 91 prior to regeneration on the write cycle, he information that was in main storage may be effectively changed. Simultaneously with the regeneration cycle, the information in the SDR 91 becomes available to the system on the AOB 221. For further details as to the timing, control, and general operation of MS 12, reference should be made to the above-identified Krygowski et al. application Ser. No. 573,246 now U.S. Pat. No. 3,453,600.

The information format of the environmental system organizes 8 bits into a basic building block called a "byte." Each byte also includes a ninth bit for parity used in error detection. The parity bit cannot be effected by the program, its only purpose being to cause a system interruption when a parity error occurs. It is assumed that the parity bit will be associated with bytes and that the normal parity checking circuitry is included throughout the system in the well-known manner.

Two bytes are organized into a larger field defined as a half-word, and 4 bytes or two half-words are organized into a still larger field called a word. More specifically, a "word" is defined as four consecutive bytes in the environmental system and will be treated as such in this invention. However, it will be understood that words or bytes can equal any number of bits.

Various data formats may be employed in the environmental system so that instructions and operands may be of different lengths depending upon the particular operation which is to be carried out.

Bytes are assigned locations in storage in consecutively numbered positions starting with zero. Each number is considered the address of the corresponding byte. A group of bytes in storage is addressed by the leftmost byte of the group. The number of bytes in the group is either implicitly or explicitly defined by the operation specified by the instruction. The addressing arrangement uses a 24-bit binary address to accommodate a maximum of 16, 777,216 byte addresses. This set of main storage addresses includes some locations reserved for special purposes.

Storage addressing wraps around from the maximum byte address to the zero address. Variable-length operands may be located partially in the last and partially in the first location of storage, and are processed without any special indication of crossing the maximum address boundary.

Fixed-length fields, such as half-words and double-words, must be located in main storage on an integral boundary for that unit of formation.

A boundary is called integral for a unit of information when its storage address is a multiple of the length of the unit in bytes. For example, words (4 bytes) must be located in storage so that their address is a multiple of the number 4. Variable-length fields are not limited to integral boundaries, and may start on any byte location.

Local Store

Local Store (LS) 13 consists of 64 one-word capacity registers which are addressed by the local store address register (LSAR) 120. The LSAR 120 is loaded from the J register (J REG) 121 which is in turn fed from the AOB 221 or the mover out bus (MOB) 222. Whenever a read operation is specified from LS 13, the addressed word in LS 13 is read out either to the L register (L REG) 126 or to the R register (R REG) 124. The L and R registers have their outputs gated either back to the LS 13 or to the adder 210.

Local store 13 has a READ and WRITE operation similar to that of the main store 12 and the specific details of operation will be found in the above-mentioned Krygowski et al. application.

Sixteen of the 64 one-word locations in LS 13 are designated as general registers which are used as index registers in address arithmetic and indexing, and used as accumulators in fixed-point arithmetic and logical operations. These general registers are identified by numbers 0–15 and are specified by a 4-bit field in instructions. Additionally, LS 13 includes working store (WS) locations which are used for various purposes throughout processing.

Central Processing Unit (CPU)

There are three basic date-bus lines that are different in width, and through which data is channeled from one register to another. These are the 32-bit adder-out bus (AOB) 221, the 24-bit instruction-address bus (IAB) 223, and the 8-bit mover-out but (MOB) 222.

The basic environmental system data flow consists primarily of two parallel paths which may be activated simultaneously. One is the 32-bit wide adder path including the adder 210 which is fed by the several 32-bit registers L 126, R 124, M 211 and H 212. The other path is the 8-bit wide logical mover path including the 8-bit mover 213 fed by the L 126, R 124 and M 211 registers. The mover manipulates 1-byte blocks in half-byte increments.

In addition to the adder and mover data paths, four other data paths are of interest in describing the basic environmental system—mainly, the shifter, instruction address, local storage, and main storage data paths.

The adder is capable of performing both binary and decimal arithmetic. Decimal arithmetic is performed by doing a binary add (true or complement) and generating a decimal correction factor into the L register in the same CPU cycle. Another cycle is needed to subtract the correction factor from the results of the preceding cycle. The adder 210 includes, besides 32 individual adder units, four parity checking circuits (one for each byte), four parity generating circuits (one for each byte), as well as carry look-ahead circuitry. When performing arithmetic functions, data are gated to the right-adder input Y from the 32-bit register H, M, or R. The left adder input XG contains a true/complement gate 220 and is fed by the 32-bit L register 126.

In a single CPU cycle, two 32-bit operands are gated one each into the XG and Y adder inputs, passed through the adder and continue on to set the adder output latches 217. At the end of the CPU cycle, the adder output is in the latches 217 ready to be gated out into an operating register. In the basic environmental system, subtraction is achieved by use of the two's complement which is controlled by the true/complement gate 220 on the XG input. When the complement gate is set, bits gated into XG will be inverted (i.e., ones become zeros and zeros become ones), thus forming the one's complement of the original XG input. The two's complement is achieved by inserting a carry into the XG adder input. Multiplication and division are accomplished using the adder by taking successive additions and subtractions. The various gating and control signals necessary to carry out the adder functions described emanate from the system control unit 11 which will be described in more detail hereinafter.

The shifter data path runs from the adder 210 to the AOB latches 217 and enables the adder output to be shifted to the left or the right either one or four places. Additionally, the shifter 215 includes means not shown for saving and storing the overflow portions of any shifted data. Again, the shifter is controlled by the system control unit 11.

The mover data path is used primarily for the execution of variable-field-length (VFL) instructions. Two byte sources may be selected simultaneously for a logical operation by the mover. The left-mover input, U, may be a byte selected from the L or R register under control of one of the two byte counters LB 101 and MB 102 or a byte formed by the contents of the two 4-bit registers MD 103 and F 104. The right-mover input, V, is a byte selected from the M register 211 under control of either byte counter LB or MB. The mover, like the other data paths, is controlled by the system unit 11. Registers G1 376 and G2 377 are shown for completeness purposes only and do not form a part of the present invention. An explanation of these registers is contained in the aforementioned System 360/50 reference.

The instruction address data path is 24 bits wide for moving and updating the 24-bit instruction contained in the instruction address register 218. The first instruction is initially set in the instruction address register (IAR) by the system control unit 11. Instructions are gated from the IAR 218 to the instruction address counter and latches 219. The instruction address counter increments the instruction address by the appropriate number of bytes (60 bytes in the case of restore in place or SS instructions) and places that updated address in the IAR via the bus 226. The current instruction address, before updating, represents the location in the main store 12 of the current instruction to be executed and it is read into the storage address register (SAR) 90, gated to the main storage 12, and causes the addressed instruction to be read out into the storage data register (SDR) 91. Instructions read out from main store 12 into the SDR pass through the gating circuitry 216 to the AOB latches 217. The sequence of gating out an instruction is call I-fetch and is broken down into first and second level I-fetch. During I-fetch, the instruction is read out and is used to set up the CPU and local store with various initial conditions prior to commencement of execution.

The system control unit 11 includes a sequence control unit 302, general purpose stats 303, a program status word (PSW) register 304, and error detection circuitry 305.

Sequence Controls

Figures 2, 3:
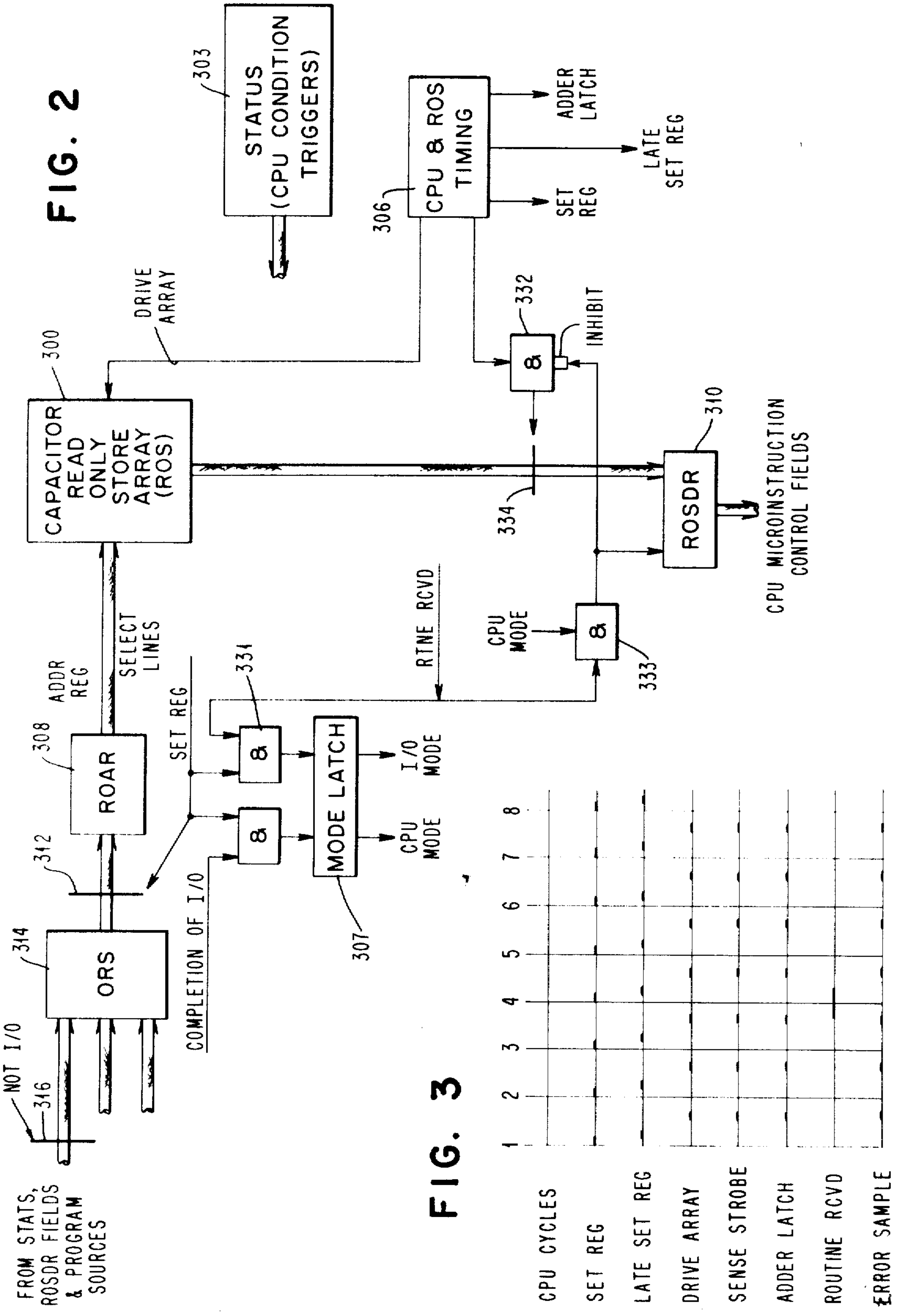
FIG. 2 is a diagram of the general organization of the sequence controls of the central processing unit of the environmental system.
FIG. 3 is a timing chart of the timing circuit 306 shown in FIG. 2.
Figure 4:
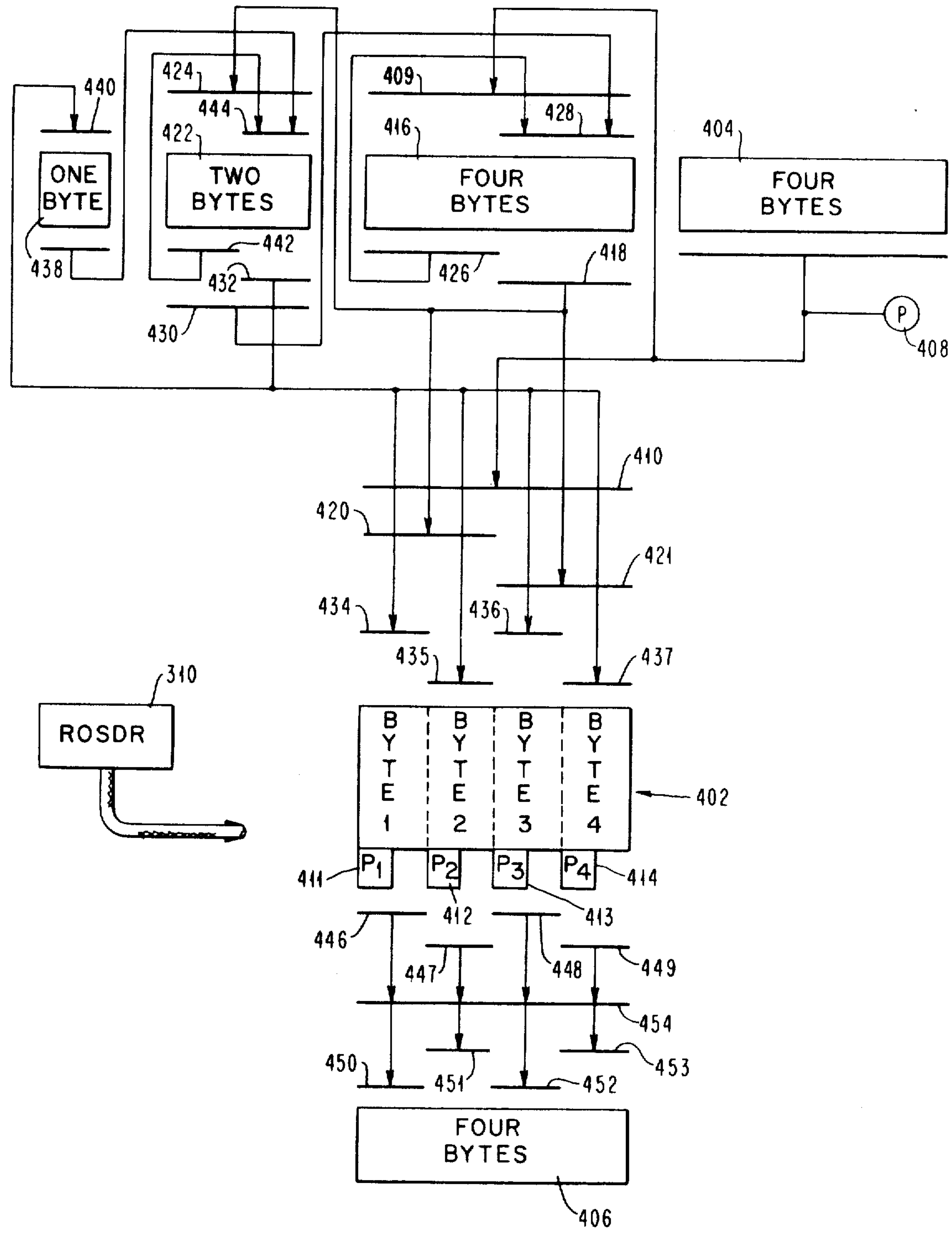

Reference is made next to FIGS. 2 and 3 which show the sequence controls for the data processing system. The sequence controls include a capacitor read only store (ROS) 300 of the type described in an article entitled "Read Only Memory" by C. E. Owen et al. on pages 47 and 48 of the IBM Technical Disclosure Bulletin, Volume 5, No. 8, dated Jan. 1963. The controls also include a mode trigger 307, condition triggers 303, also known as STATS, and timing circuits 306. The timing circuits 306 produce five cyclic signals at the CPU frequency which are phased with respect to the zero time reference of each CPU cycle as shown in FIG. 3.

Data in the read only store is addressed by a 12-bit selection register (ROAR) 308. Address signals for the ROAR may be taken from various sources including a portion of the output control information from the read only store data register (ROSDR) 310 in each CPU cycle to select one of 2,816 90-bit control words and to enter the same in the read only storage data register 310. Each word, known as a microinstruction, is transferred into the read only store data register 310 at SENSE STROBE time which occurs just prior to the start of the next CPU cycle, and it controls the operation of the central processing unit during the next cycle.

The state of the read only store address register 308 is determined prior to the Drive Array pulse (FIG. 3) and controls the state of the read only store data register 310 at the following SENSE STROBE time. Thus, each entry into the read only store address register 308 usually controls the activity of the CPU in the next consecutive CPU cycle following the entry.

Each entry into the ROAR is determined in one of several different ways by the inputs presented to gates 312 through a network of OR gates 314. Ordinarily the 12 bits presented to the OR network 314 are derived selectively through gates 316 from one or more sources including a segment of the ROSDR, output conditions registered by selected condition STATS 303 and selected program branching information (program instruction operation codes).

The preceding discussion has presumed that the mode latch 307 is set to CPU mode and that CPU operation has not been interrupted by any input-output (I/O) units. Requests from I/O units are recognized by receipt of a Routine Received (RTNE RCVD) signal. It may be seen from the inputs to the AND gate 331 in FIG. 2 that, if the CPU is in the CPU mode when a RTNE RCVD signal is received, the mode latch 307 is not set to the I/O mode until SET REG time of the cycle following the rise of RTNE RCVD. This permits the CPU to complete execution of the current microinstruction. If the CPU mode is up when the RTNE RCVD signal is received, the AND gate 333 is operated to provide an output level which is up, and this level inhibits the AND circuit 332, thereby suppressing the SENSE STROBE signal of sense gate 334 which normally supply input signals to the read only storage data register 310 from the read only store 300. This will permit the I/O request to be serviced in the manner described and claimed in the above-referenced application Ser. No. 573,246, filed Aug. 18, 1966.

DETAILED DESCRIPTION OF THE PRESENT INVENTION

Referring to FIG. 4, various details of the invention may be seen. There is shown a functional unit 402 which receives data from a register 404 and passes data to another register 406. The functional unit 402 may be a unit which operates upon, and changes, data (such as an adder) or it may be a unit which does not change data passing through it (such as a register or a data bus). The register 404 could equally well be any other source of data (such as an input/output unit, a memory or an adder), and the register 406 could also be any unit which may receive data. Units 404 and 406 will hereinafter be referred to as "registers" for purposes of explanation, but it will be recognized by those skilled in the art that they are not limited to being registers. During normal operation of the system, as data flows from register 404 it will be checked for correct parity by a parity circuit 408 implemented in any known manner. The data will be gated, under control of a ROS word in ROSDR 310 through a gate 410 into the functional unit 402. The data will then be gated to register 406. Each byte of data coming from the output of unit 402 will be checked for correct parity. If the parity of any byte is not correct, an associated parity check indicator 411, 412, 413 or 414 will be set.

The elements described above are presumed to already be present in the environmental system. However, it will be recognized by those skilled in the art that the location within a data processing system of parity checking circuits such as parity circuit 323 shown in FIG. 1, will often depend to a great extent upon other design criteria. Although it is preferred that data entering a functional unit with which this invention is associated should be checked for proper parity, it is recognized that it will not always be absolutely necessary for the parity check to immediately precede the particular functional unit. It will also be recognized by those skilled in the art that, when implementing this invention on a data processing system which does not already contain sufficient parity checking circuits, such circuits can easily be added where needed.

To provide for the situation where source data contained in register 404 may be altered before an error is detected, an auxiliary register 416 that is the same size as register 404 is provided. As data are gated from register 404 to unit 402, the same data will simultaneously be gated to register 416 under control of the ROS word in the ROSDR 310. Data in the right (low-order) half of register 416 can be gated out through gate 418 to either half of the unit 402 through gates 420 and 421. In accordance with the preferred embodiment of this invention, only the lower order half of register 416 is capable of gating data to the unit 402. Therefore, an additional register 422 which is one-half the size of register 416 is provided. Data that are gated from the low-order half of register 416 to unit 402 will simultaneously be gated through gate 242 into register 422. Data contained in the high-order half of register 416 can then be gated through gates 426 and 428 to the low-order half of register 416 for the second pass through unit 402. The data originally contained in the low-order half of register 216 can later be restored if desired by gating the contents of register 422 into the low-order half of register 416 through gates 430 and 428.

If neither half of the unit 402 is functioning properly, this invention will permit use of one-fourth of unit 402. In the exemplary environmental system, this means that 1 byte of data will be processed during each pass. In this situation, the low-order half of register 416 will be gated to register 422. The low-order half of register 422 can be gated out through gate 432 into any fourth of unit 402 through one of the gates 434, 435, 436 or 437. The data in the low-order half of register 422 will simultaneously be gated into still another auxiliary register 438 through gate 440. After the first byte of data had been successfully processed by the functional unit 402, the high-order contents of register 422 will be gated through gates 442 and 444 into the low-order positions of register 422 from where it will also be gated to functional unit 402. The high-order half of the original data word will be gated to the low-order half of register 416 through gates 426 and 428. After the second byte of data has been successfully processed, the high-order half of the data word will be gated to register 422, and the third and fourth bytes of data will then be gated to the properly functioning section of unit 402. As bytes or half-words of data pass through unit 402, they will be gated to appropriate portions of register 406. The gating at the output of unit 402 is shown in FIG. 4 as comprising four gates 446, 447, 448 and 449 each of which can pass 1 byte (one-fourth word) of data. The input gating to register 406 is shown as comprising four gates 450, 451, 452 and 453 each of which gates 1 byte of data to register 406. Connected between the sets of gates 446–449 and 450–453, there is shown an additional set of gates 454 which are used to direct each output byte of data from unit 402 to the appropriate position in register 406. The exact manner in which the various gates shown in FIG. 4 are implemented is not significant so long as the gating is sufficient to allow each portion of the data word to arrive at its appropriate destination. The manner in which a control store can be used to control gating of the type described above is well known in the art and need not be further described herein. Many additional details concerning the gating and controls may be found in references previously incroporated into this specification.

Figures 5, 6:
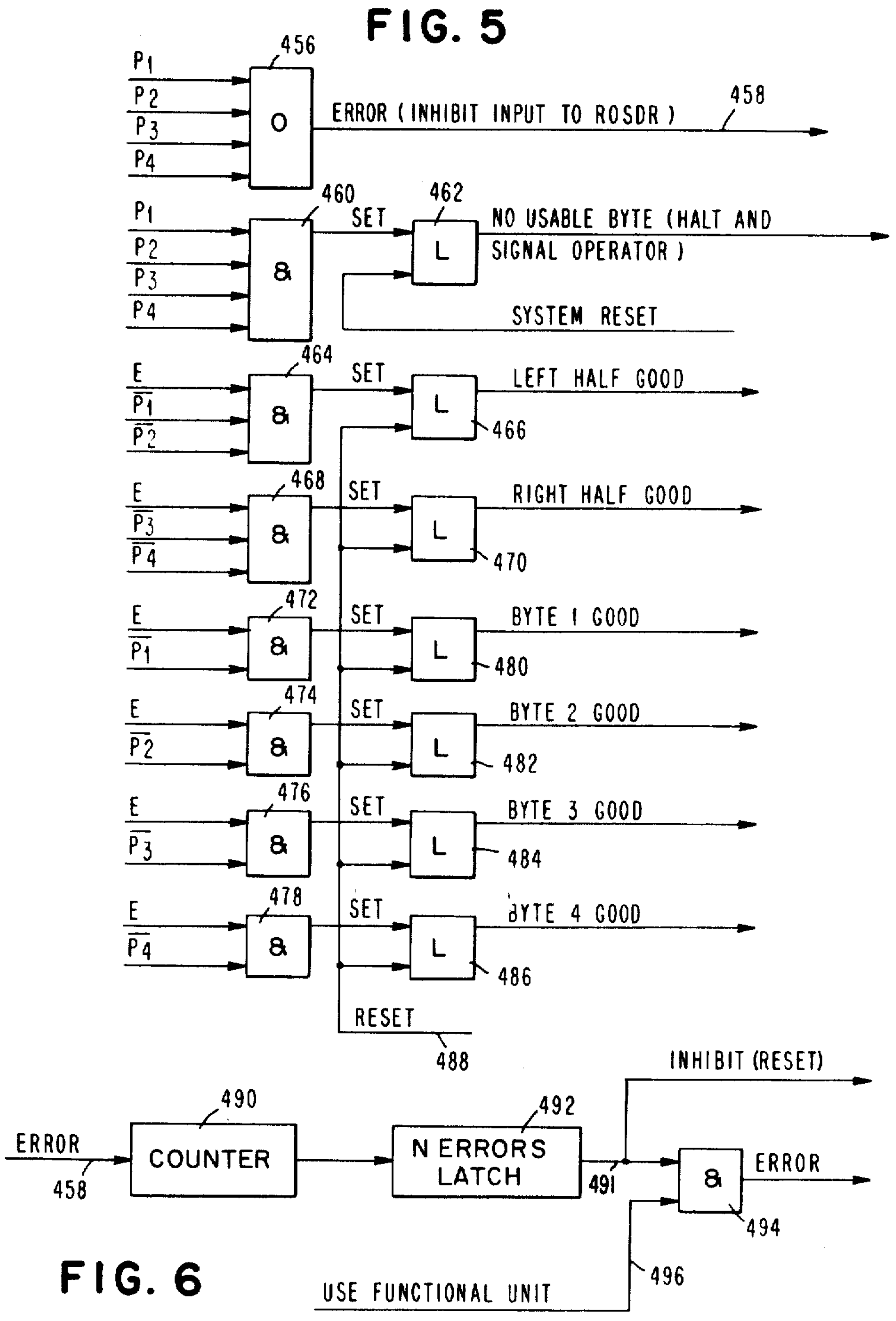
FIG. 5 shows how the various error indicators may be used to control the flow of data through a functional unit when an error is detected.
FIG. 6 shows an error counter and latch which may be used to detect solid errors.

Referring to FIG. 5, various latches and logic circuits which may be used to determine the condition of the functional unit 402 (FIG. 4) are shown. The output of each of the parity check indicators 411–414 (FIG. 4) is fed to an OR circuit 456. The output 458 of OR circuit 456 is used to signal the system that an error has occurred. This signal may be used to inhibit the input gates of ROSDR and force the word in ROS location zero to assume control of the system in the manner more fully described in previously referenced application Ser. No. 697,738. All of the parity error signals are also fed to AND circuit 460, the output of which is used to set a latch 462 to produce a signal which indicates that no portion of the functional unit is operating properly. In this situation, the prior art approach of stopping the system would be used. AND circuit 464 receives the error signal and the inverted outputs of parity error indicators 411 and 412. The output of AND circuit 464 is used to set a latch 466 which, when on, indicates that the left half of the functional unit is operating properly. Similarly, the error signal 458 along with the inverted outputs of parity error indicators 413 and 414 feed an AND circuit 468, the output of which is used to set a latch 470 which, when on, indicates that the right half of the functional unit is operating properly. In like manner, the error signal 458 is fed to one input of each of the AND circuits 472, 474, 476 and 478. These AND circuits receive, as a second input, the inverted output of parity error indicators 411, 412, 413, and 414, respectively. The output of AND circuit 472 can set a latch 480 to indicate that byte one of the functional unit is functioning properly; the output of AND circuit 474 can set a latch 482 to indicate that byte two of the functional unit is operating properly; the output of AND circuit 476 can set a latch 484 to indicate that the third byte of the functional unit is operating properly; and the output of AND circuit 478 can set a latch 486 to indicate that the fourth byte of the functional unit is operating properly. After data have been successfully passed through the functional unit, each of the latches 466, 470, 480, 482, 484 and 486 will be reset by a pulse on reset line 488. This will return the system to its normal processing mode of operation and, the next time that the system attempts to use the functional unit 402 (FIG. 4), the full capability of the unit will be used. This is desirable because the error that was originally detected may have been intermittent in nature and have subsequently disappeared. In such a situation, the full power of the functional unit will then be used.

Referring to FIG. 6, in order to detect a situation in which the error is truly solid, and in which it would be wasteful of time to always attempt to utilize the full capability of the functional unit, an error counter 490 is also included in the preferred embodiment. Each time that an error is detected in the functional unit, the error signal 458 will increment counter 490. After a predetermined number N of errors have been detected, a latch 492 will be set. The output 491 of latch 492 will be used to inhibit the reset pulse which appears on reset line 488 and will also be fed to an AND circuit 494. Once the latch 492 has been set, the output of AND circuit 494 will produce an error signal each time that there is an attempt to use the functional unit. Attempts to use the functional unit will be sensed by a signal appearing on line 496 which may, for example, be coupled to the signal that is used to enable input gate 410 of the functional unit 402 shown in FIG. 4. Since latches 466, 470, 480, 482, 484 and 486 will not have been reset since the last time that an error was detected, the system will already be conditioned for multiple pass operation of functional unit 402. The error signal produced at the output of AND circuit 494 may be used in exactly the same manner as was error signal 458 to force the word at location zero of ROS to assume control of the system.

It will be recognized by those skilled in the art that certain aspects of the invention as described above in connection with FIGS. 4, 5 and 6 are matters of choice and convenience which may be subjected to many variations. For example, in an environmental system wherein the data contained in register 404 cannot change before an error is detected and where the output gates of register 404 are designed such that a fractional portion of the register may be gated out, then the auxiliary register 416 could be dispensed with. Also, if the register 404 (or the auxiliary register 416) were designed in such a manner that any portion of the data contained therein could be gated out to an appropriate input gate of functional unit 402, then one or both of the additional auxiliary registers 422 and 438 would not be necessary. However, in the environmental system herein described and in many other systems wherein this invention may be used, the contents of register 404 generally will be subject to possible alteration before detection of an error, and the auxiliary register 416 will therefore be required. Also, implementation of the invention will often be facilitated by an arrangement of registers such as that shown in FIG. 4 rather than by supplying all of the required gating at one register. Generally, each functional unit with which the invention is used will require additional circuitry such as that shown in FIGS. 4 and 6. Circuitry such as that shown in FIG. 5 may be shared by a plurality of functional units or may be supplied for each unit as desired.

Operation of the Invention

Referring again to FIGS. (FIG. 5 and 6, the operation of the invention will be described. In this example, it will be assumed that the data coming from register 404 contains proper parity. It will also be assumed that bytes 1 and 3 of functional unit 402 are defective. The final assumption will be that the error latch 492 (FIG. 6) has not been set.

It is desired that data contained in register 404 be passed through (or operated upon by) functional unit 402 and then passed to register 406. The sequence control unit (302, FIG. 1) of the system will cause gate 410 to pass data from register 404 to functional unit 402 and will cause the same data to be passed through gate 409 into the auxiliary register 416. These gates are preferably operated in parallel (for example, by tying their controls together) so as not to degrade the normal error-free performance of the system. As data passes from the output of unit 402 to register 406, parity error indicators 411 and 413 will come on. Referring to FIG. 5, the inputs $P_1$ and $P_3$ of OR circuit 456 will cause the error signal 458 to come on. This will cause the sequence control unit to take its next instruction from the ROS word at location zero. Latches 482 and 486 will be turned on while latch 462, 466, 470, 480 and 484 will remain off. These latches will be interrogated in a known manner by the sequence control unit to determine the manner in which data will be gated through the system. If the latches are interrogated in the same sequence that they are shown (from top to bottom) in FIG. 5, then latch 482 will be the first latch which is detected as being on. Therefore, byte 2 of the functional unit 402 will be used to process the data word.

Referring again to FIG. 4, gates 418 and 424 will be opened to allow data to pass from the low-order half of register 416 into register 422. Subsequently, gates 432, 440 and 435 will be opened to enable to lowest order byte of data to pass from register 422 into the byte 2 portion of functional unit 402 and into register 438. This byte of data will be processed by functional unit 402 and then passed through gates 447, 454 and 453 into the lowest order byte position of register 406. In the preferred embodiment of the invention, while data are being passed from the unit 402 to register 406, gates 442 and 444 will open so that the second lowest order byte of data will pass from the higher order half of register 422 to the lower order half thereof. (Although various operations described herein are preferably done in parallel with other operations, it will be recognized by those skilled in the art that they may be performed serially if desired). The second lowest order byte of data will then be gated through gates 432 and 435 to byte 2 of functional unit 402, and from there through gates 447, 454 and 452 to the second lowest order position of register 406. While the above operation was taking place, gates 426 and 428 will have been enabled so that the data contained in the high-order half of register 416 will be transferred to the low-order half thereof. Gates 418 and 424 will then be enabled to pass this data into register 422. From register 422, the third lowest order byte of data will pass through gates 432 and 435 to the byte 2 portion of functional unit 402 from where it will pass through gates 447, 454 and 451 to the third lowest order byte portion of register 406. During the time that the result data is passing to register 406, gates 442 and 444 will be enabled so that the highest order byte of data will pass to the low-order half of register 422. Subsequently, this last byte of data will also be gated through gates 432 and 435 to the byte 2 portion of unit 402 from where it will pass through gates 447, 454 and 450 to the highest order byte position of register 406. Throughout the above operation, means (not shown) within the sequence controls of the data processing system will query parity error detection unit 412 to assure that no additional errors have occurred. If, during any of the above operations, parity error detection signal 412 were to come on, the sequence controls of the system would interrogate latch 484 (which is off) and then latch 486 (which is on). In such a case, the byte of data which was being processed at the time that signal 412 came on would be reprocessed through byte 4 of functional unit 402 and all subsequent bytes of data would also be processed through the byte 4 position of unit 402. If the byte 4 error signal 414 were also to come on, then the output of latch 462 of FIG. 5 would signal the system that no byte of unit 402 was usable and system operation would halt. After the data word had been successfully processed and the result stored in register 406, a signal on reset line 488 will reset the latches 466, 470, 480, 482, 484 and 486. This signal will also be used to reset each of the parity error indicators 411, 412, 413, and 414.

It will be noted that, in the above example, although bytes 2 and 4 of functional unit 402 were both assumed to be operating properly, only one of them was used. Also, if both bytes 2 and 3 of unit 402 had been functioning properly, only the byte 2 portion would have been used. Although it would be feasible to utilize any two properly functioning byte portions of unit 402 simultaneously (even if the portions were not adjacent), this is not done in the preferred embodiment because of the additional complexity of gating and controls that would be required. However, in light of the above description of the preferred embodiment, the manner in which such an implementation could be accomplished will be clear to those skilled in the art. It will also be clear to those skilled in the art that such an embodiment is within the spirit and scope of this invention.

Implementation of This Invention in Connection With the Adder of the Environmental System Although the above description is generally applicable to implementations of this invention with any functional unit of a data processing system, it will be recognized by those skilled in the art that certain aspects of the invention may depend to some extent upon the exact nature of the functional unit with which it is used. This is particularly true in the case of functional units wherein operations which take place in one part of the unit may affect data being operated upon in other parts of the unit. For example, when two words of data are being added together in the adder of the environmental system, carries can occur from one stage of the adder to another. Also, in the case of the adder, there will generally be two separate sources of data used in the adding operation.

Figure 7:
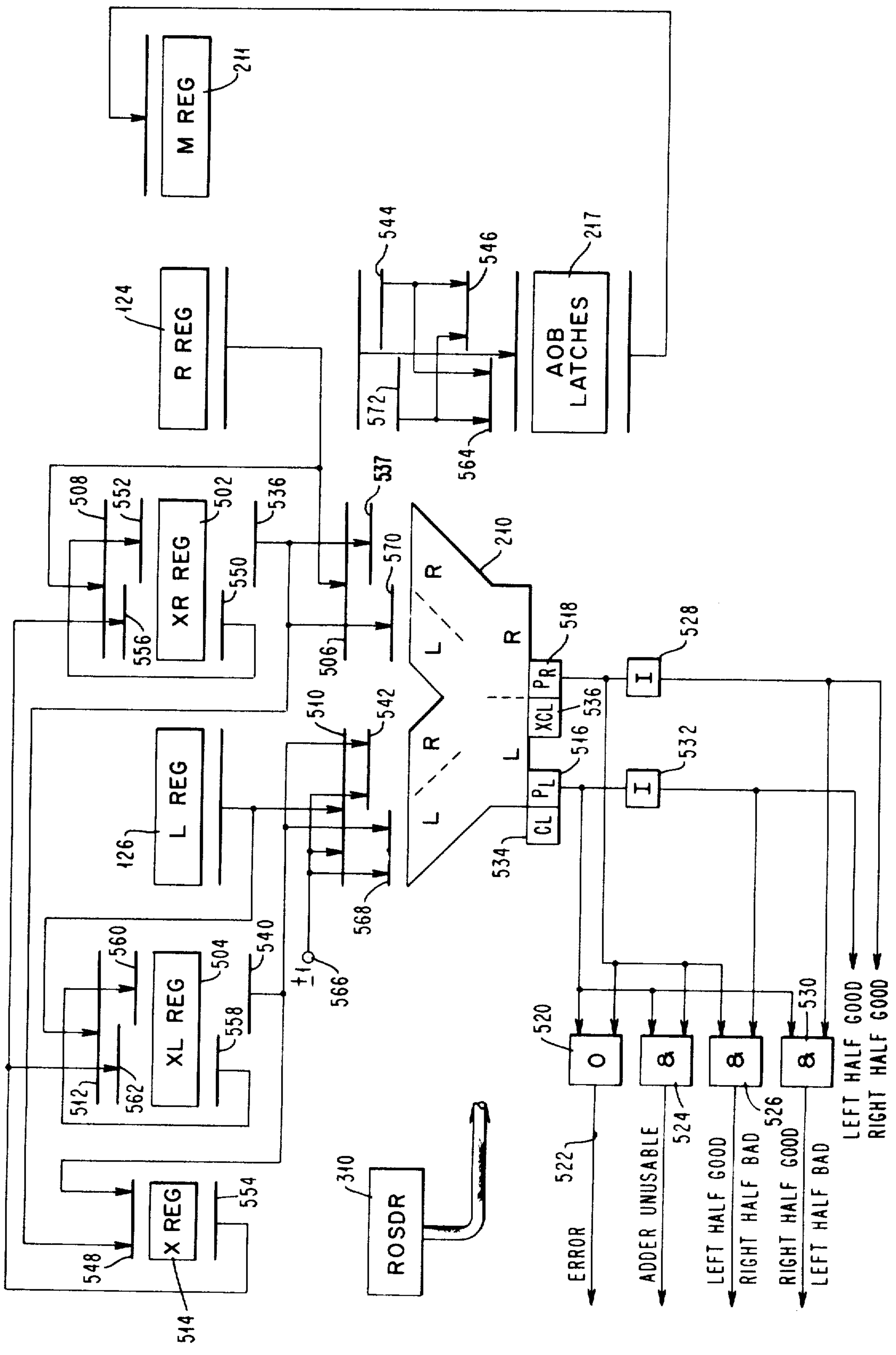
FIG. 7 shows a more specific implementation of the invention when it is utilized in connection with the adder of the environmental system.

FIG. 7 shows a preferred embodiment of this invention when used in connection with the adder of the environmental system. In the embodiment shown in FIG. 7, it is assumed that the two data words which are to be added together are contained in the L Register 126 and the R Register 124. The two data words will be added together in the adder 210 and the output (sum) will be stored in the adder out bus (AOB) latches 217, from where it will be transferred to the M Register 211. Although it is recognized that the adder 210 can receive its input from sources other than the registers 124 and 126, and can have its output directed to other destinations than the register 211, the simplified drawing as shown in FIG. 7 and the following description thereof will be sufficient to teach one skilled in the art how to implement this invention in connection with an adder which can receive data from a plurality of sources and direct data to a plurality of destinations. The only significant difference between the simplified system shown in FIG. 7 and a more complex system will be in the complexity of the required gating.

In order to save source data which was contained in the R REG 124, an auxiliary register XR REG 502 is provided. Source data originally contained in the L REG 126 will be saved in auxiliary register XL REG 504. As data are gated from the R REG 124 through gate 506 to the adder 210, they will simultaneously be gated to the XR REG 502 through gate 508. Also, a data word gated from the L REG 126 to the adder 210 through gate 510 will simultaneously be gated to the XL REG 504 through gate 512. Because each of the auxiliary registers 502 and 504 is capable of gating only data contained in the low-order half thereof to the adder 210, a third auxiliary register X REG 514 is also provided. X REG 514 serves basically the same function as register 422 previously described with respect to FIG. 4. Auxiliary registers XR REG 502 and XL REG 504 are the same size as the source registers R REG 124 and L REG 126; the X REG 514 is one-half the size of the others. The gating between the output of X REG 514 and the inputs of XR REG 502 and XL REG 504 differs from that shown in FIG. 4 in that the output of register 514 is gated to the high-order half of registers 502 and 504. With the gating arrangement shown in FIG. 7, the high-order half and the low-order half of XR REG 502 can be interchanged (rotated) as can the high-order and low-order halves of XL REG 504. As will be recognized by those skilled in the art, instead of having the X REG 514 being shared by the other auxiliary registers, one half-width register similar to X REG 514 could be provided for each of the other auxiliary registers if desired.

As data passes through the adder 210, parity errors will be signalled by a left parity error indicator 516 or by a right parity error indicator 518. Since the output of the adder 210 of the environmental system contains four parity check circuits (one for each byte), the left parity indication can easily be obtained by OR'ing the outputs of the two higher order parity error indicators and the right parity error indication can be obtained by OR'ing the outputs of the two lower order parity indicators. The output of the left and right parity error indicators are both fed to an OR circuit 520, the output 522 of which is used interrupt the normal operation of the data processing system in the same manner as was described above in connection with the error signal 458 shown in FIG. 5. Both of the parity error indicator outputs are also fed into an AND circuit 524 the output of which may be used to signal that neither half of the adder is functioning properly. The output of the right parity error indicator 518 is fed to an AND circuit 526 and, after being inverted by an inverter 528, to an AND circuit 530. The output of the left parity indicator is fed to AND circuit 530 and, after being inverted by inverter 532, to AND circuit 526. When AND circuit 526 is enabled, its output will indicate that the left half of the adder is functioning properly and that the right half is not; an output from the AND circuit 530 is an indication that the right half of the adder is functioning properly while the left half is not. The outputs of AND circuits 524, 526 and 530 can be used to set latches which will be interrogated by the sequence controls of the system. The adder 210 of the environmental system contains a carry latch (CL) 534 at its high-order end which is normally used by the environmental system to identify adder overflow conditions. In situations where only the left (high-order) half of the adder is functioning properly, this invention will utilize CL 534 to keep track of a possible carry from the low-order half of the sum to the high-order half. For situations where only the right (low-order) half of the adder is functioning properly, an auxiliary carry latch (XCL) 536 is provided to keep track of a carry from the low-order to the high-order half of the sum.

The embodiment shown in FIG. 7 will operate in a manner very similar to that shown in FIG. 4. As data are gated from the source registers 124 and 126 to the adder 210, they will simultaneously be gated to the auxiliary registers 502 and 504. Detection of a parity error will result in the generation of an error signal 522 which is utilized to cause the system to interrupt its normal processing and to cause the word located at ROS location zero to be read into the ROSDR 310. Assuming that the invention is utilized in connection with more than one functional unit of the data processing system, a determination as to which unit failed may easily be made by interrogating the various parity error indicators in any of a variety of manners well known to those skilled in the art. Once it has been determined that the error occurred in the adder, the outputs of AND circuits 524, 526 and 530 will indicate whether or not one half of the adder is functioning properly, and which half it is. If only the right half of the adder is functioning properly, there will be a signal present at the output of AND circuit 530 and there will be no signal present at the output of either of the AND circuits 524 and 526. The low-order half of XR REG 502 will be gated through gates 537 and 538 to one of the right-half inputs of the adder 210 and, simultaneously, the low-order half of XL REG 504 will be gated through gates 540 and 542 to the other right-half input of the adder 210. The adder 210 will produce the low-order half of the desired sum and transmit it through gates 544 and 546 to the low-order half of the AOB latches 217. If this first pass through the adder 210 results in a carry from the low-order half of the sum, the auxiliary carry latch 536 will be set. In order to rotate the contents of XR REG 502, the low-order contents thereof will be gated through gates 537 and 548 into X REG 514; then gates 550 and 552 will be enabled so that the data in the high-order half of XR REG 502 will be transferred to the low-order half thereof; and the contents of X REG 514 will then be permitted to pass through gates 554 and 556 to the high-order half of XR REG 502. Similarly, the contents of XL REG 504 will be rotated by: first, enabling gates 540 and 548; second, enabling gates 558 and 560; and third, enabling gates 554 and 562. The original high-order halves of the data words will then be contained in the low-order halves of auxiliary registers 502 and 504. The data contained in the low-order halves of auxiliary registers 502 and 504 will then be gated through the right-half inputs of the adder 210 and transmitted therefrom through gates 544 and 564 to the high-order half of the AOB latches 217. During the second pass through the adder, if XCL 536 had been set, then an additional "plus one" pulse would be caused to be generated on the line 566 to account for the carry from the low-order half of the sum to the high-order half. After the correct sum had been developed, the parity error indicators 516 and 518, and the carry latches 534 536 would be reset, the contents of the AOB latches 217 would be transferred to the M REG 211, and normal processing would continue. If only the left-half of the adder 210 had been functioning properly, the operation of the invention would have been substantially as described above with the following exceptions:

1. Input to the adder would have been received through the left-half gates 568 and 570;

2. The adder outputs would have been transmitted through gate 572 to the AOB latches; and 3. CL 534 would have been utilized to signal a carry from the low-order half of the sum to the high-order half.

Of course, if only the left half of the adder is functioning properly, the left parity error indicator 516 will be on and the right parity error indicator 518 will be off. Also, there will be a signal present at the output of AND circuit 530 and no signal present at the output of AND circuit 526.

Other Variations of the Invention

As has been mentioned above, many variations in form and details of this invention are feasible for any specific implementation thereof. Several of these variations are mentioned below. It will be recognized by those skilled in the art that the following variations are exemplary in nature and are by no means exhaustive.

Throughout the above description of the invention, it was assumed that the environmental system contains a read only control storage (ROS). Of course, the invention could just as well be implemented in a system which contained a writable control store (i.e., a control store which comprises, for example, a magnetic core matrix to which appropriate control words may be read depending upon the nature of the error which was detected). In a system in which one or more functional units have this invention associated with them, the splitting and multiple-pass operation of a functional unit could be controlled by means of programmed (software) instructions. In this case, the programmed instructions would assume the function of a sequence control unit.

Another variation concerns the error-checking circuits used in the environmental system. Instead of using parity error correction (which can detect but not correct errors), any suitable error detection or error correction technique could be used. If circuitry with error-correcting capability were used, it might be desirable to correct errors in a small number of bits by using the error correction circuitry and to use the split-unit, multiple-pass operation of the invention when a large number of errors occur. Also, it is not absolutely necessary to check the correctness of data immediately before it enters a functional unit if error checking is done at a point in the data flow near enough to the functional unit for there to be reasonable assurance that the data are correct.

In recursively splitting a functional unit for multiple-pass operation, it will generally not be desirable to utilize a segment of data that is too small to permit error checking. However, in exceptional circumstances, this of course may be done.

In still another variation of the invention, data that had passed through the portion of the functional unit that was operating properly could be retained. Then, only the data that had originally gone through the portion of the functional unit that was not functioning properly would have to be recycled through the good portion.

When a functional unit is to be operated on a split, multiple-pass basis because of an error which occurred therein, the splitting need not necessarily be binary (half, quarter, eighth, etc.) in nature. The unit could just as easily be split into thirds, fifths, or any other fraction of its full capacity. As a practical matter, it will generally be best to divide the functional unit in a manner that is related to the number of segments in a data word upon which error checking is accomplished by the system.

Yet another variation would be to implement this invention in a system such as that shown in U.S. Pat. No. 3,248,697 which issued on Apr. 26, 1966 to H. C. Montgomery for ERROR CLASSIFICATION AND CORRECTION SYSTEM. The patent describes a system wherein detection of an error will, in certain circumstances, cause the system to attempt to reexecute the instruction during the course of which the error was detected. If this invention were to be implemented on such a system, many transient errors would be quickly handled by the normal reexecution capabilities of the system, and other errors would be handled by this invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data processing system which includes a functional unit having a plurality of portions through which successive groups of segments of data normally pass simultaneously in parallel by segment, said system also including error de ection means for signalling the occurrence of a malfunction in said unit; apparatus to enable said system to operate despite said malfunction, comprising:

first means responsive to a signal from said error detection means for causing a group of segments of data to pass, one segment following another serially by segment, through one of said portions of said unit; and means responsive to said first means for disabling said first means upon termination of said signal from said error detection means enabling a subsequent group of segments of data to pass simultaneously in parallel by segment through said one of said portions of said unit.

2. In a data processing system which includes a functional unit having a plurality of portions, and error detection means for signalling the occurrence of a malfunction in a first one of said portions; apparatus to enable said system to operate despite said malfunction, comprising:

saving means for saving input data supplied to said first portion;

data flow control means responsive to signal from said error detection means for causing said saved data to pass from said saving means to a second one of said portion; and means responsive to the data flow control means for automatically inhibiting the passage of saved data to said second one of said portions upon termination of said error detection signalling.

3. In the data processing system of claim 2, said apparatus further comprising:

counting means responsive to the detection of the occurrence of a malfunction in said unit for counting the number of times that a malfunction has been detected in said unit.

4. In the data processing system of claim 3, said apparatus further comprising:

means responsive to a predetermined count is said counting means for producing an inhibiting signal;

means for generating a use-indicating signal in response to an attempt by said data processing system to supply data to said functional unit; and means jointly responsive to said inhibiting signal and to said use-indicating signal for inhibiting passage of said saved data through said first portion of said functional unit.

5. In the data processing system of claim 2, said data flow control means comprising:

determining means for determining in which portion of said unit said malfunction occurred.

6. In the data processing system of claim 5, said apparatus further comprising:

means responsive to a signal from said determining means indicating the occurrence of an error in said second portion for causing said saved data to pass from said saving means to a third portion of said unit.

7. In the data processing system of claim 5, wherein said second portion of said unit comprises a plurality of subportions, said apparatus further comprising:

additional determining means for signalling the occurrence of an error in a first subportion of said second portion; and means responsive to a signal from said additional determining means for causing said saved data to pass from said saving means to a second subportion of said second portion of said unit.

8. In the data processing system of claim 5, wherein said second portion of said unit comprises a plurality of subportions, said apparatus further comprising:

means responsive to a signal from said determining means indicating the occurrence of an error in said second portion for causing said saved data to pass from said saving means to a first subportion of said second portion of said unit.

9. In a data processing system which includes a functional unit having a plurality of portions, input means for supplying input data to said unit, and error-indicating means capable of indicating the occurrence of a malfunction in one of said portions, said functional unit normally presenting data at its output in a parallel format; apparatus to enable said system to continue to operate despite the occurrence of a malfunction in said unit, comprising:

determining means responsive to said error-indicating means for indicating in which of said portions a malfunction occurred;

saving means for saving input data;

gating means connected between said saving means and said unit;

data flow control means responsive to said determining means for causing said gating means to pass saved input data from said saving means to a portion of said unit other than one for which said determining means has indicated the occurrence of a malfunction, said unit thereby being caused to present data at its output in a nonparallel format;

means responsive to data presented in said nonparallel format for rearranging same into said parallel format; and means responsive to said data flow control means for disabling said gating means upon termination of said error signal from said error-indicating means enabling subsequent utilization of said operation of said unit for which a malfunction was indicated, said unit thereby being caused to again present data at its output in said parallel format.

10. In the data processing system of claim 9, the apparatus wherein:

said functional unit comprises a high-order-half portion and a low-order-half portion;

said saving means comprises an auxiliary register for storing said input data; and said data flow control comprises means responsive to an indication by said determining means that a malfunction occurred in said low-order-half portion and no malfunction occurred in said high-order-half portion by causing said gating means to pass all input data to said high-order-half portion, and said data flow control comprises means responsive to an indication by said determining means that a malfunction occurred in said high-order-half portion and no malfunction occurred in said low-order-half portion by causing said gating means to pass all input data to said low-order-half portion.

11. In the data processing system of claim 10, said apparatus further comprising:

counting means responsive to the detection of the occurrence of a malfunction in said unit for counting the number of times that a malfunction has been detected in said unit.

12. In the data processing system of claim 11, said apparatus further comprising:

means responsive to a predetermined count in said counting means for producing an inhibiting signal;

means for generating a use-indicating signal in response to an attempt by said data processing system to supply data to said functional unit; and means jointly responsive to said inhibiting signal and to said use-indicating signal for inhibiting passage of saved data through the malfunctioning portion of said functional unit.

13. In the data processing system of claim 10, the apparatus wherein:

each of said low-order-half portion and said high-order-half portion comprises subportions of said unit;

said data flow control comprises means responsive to an indication from said determining means that a malfunction has occurred in each of said low-order-half portion and said high-order-half portion for causing said gating means to pass saved data from said saving means to one of said other portions of said functional unit.